US010951689B1

(12) United States Patent
Zhang et al.

(10) Patent No.: US 10,951,689 B1
(45) Date of Patent: Mar. 16, 2021

(54) ELECTRONIC DEVICE ALLOCATION AND ROUTING

(71) Applicant: MASSACHUSETTS MUTUAL LIFE INSURANCE COMPANY, Springfield, MA (US)

(72) Inventors: Nailong Zhang, Springfield, MA (US); Zizhen Wu, Springfield, MA (US); Adam Fox, Springfield, MA (US); Sarah Porter, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/427,830

(22) Filed: May 31, 2019

Related U.S. Application Data

(60) Provisional application No. 62/680,460, filed on Jun. 4, 2018.

(51) Int. Cl.
*H04L 29/08* (2006.01)
*G06F 16/21* (2019.01)
*G06F 16/2455* (2019.01)
*G06N 7/00* (2006.01)
*H04L 12/26* (2006.01)

(52) U.S. Cl.
CPC .......... *H04L 67/1002* (2013.01); *G06F 16/21* (2019.01); *G06F 16/2455* (2019.01); *G06N 7/005* (2013.01); *H04L 29/08153* (2013.01); *H04L 43/16* (2013.01)

(58) Field of Classification Search
CPC .......... H04L 67/1002; H04L 29/08153; H04L 29/0823; H04L 43/16; G06F 16/21; G06F 16/2455; G06N 7/005; G06N 17/153; G06N 17/18
USPC .................................................. 709/217–219
See application file for complete search history.

(56) References Cited

U.S. PATENT DOCUMENTS

| | | | | |
|---|---|---|---|---|
| 2002/0169857 A1* | 11/2002 | Martija | ................... | H04L 29/06 709/220 |
| 2004/0243328 A1* | 12/2004 | Rapp | .................. | G06K 9/00496 702/71 |
| 2011/0149805 A1* | 6/2011 | Yasuie | .................... | H04L 41/12 370/255 |
| 2013/0238251 A1* | 9/2013 | Zhu | ....................... | G06K 9/6217 702/19 |
| 2019/0295114 A1* | 9/2019 | Pavletic | ................. | G06Q 50/01 |

OTHER PUBLICATIONS

Marty Sapp, Ed D., Festus E. Obiakor, Amanda J. Gregas, and Steffanie Scholze. "Mahalanobis distance: A multivariate measure of effect in hypnosis research." Sleep and Hypnosis 9, No. 2 (2007): 67. (Year: 2007).*

(Continued)

*Primary Examiner* — George C Neurauter, Jr.
(74) *Attorney, Agent, or Firm* — Foley & Lardner LLP

(57) ABSTRACT

An advisor distribution system may include an advisor management system, which may include various software modules. The advisor management system may allow for a balanced distribution of a plurality of advisors operating a plurality of advisor computing devices into multiple groups based on value of a Mahalanobis Distance between each covariate of the plurality of advisors operating the plurality of advisor computing devices.

20 Claims, 4 Drawing Sheets

(56) References Cited

OTHER PUBLICATIONS

Rosenbaum, Paul R., and Donald B. Rubin. "Constructing a control group using multivariate matched sampling methods that incorporate the propensity score." The American Statistician 39, No. 1 (1985): 33-38. (Year: 1985).*

* cited by examiner

ELECTRONIC DEVICE ALLOCATION AND ROUTING

CROSS-REFERENCE TO RELATED FILINGS

This application claims priority to U.S. Provisional Application No. 62/680,460, filed Jun. 4, 2018, which is hereby incorporated by reference in its entirety.

TECHNICAL FIELD

This application relates generally to an electronic device allocation system, and more specifically to a method for balancing a distribution of a plurality of electronic devices into multiple groups according to their associated covariates.

BACKGROUND

Standard randomization routing methods for routing electronic requests to multiple electronic devices have played a fundamental role for many entities. When an entity server receives an electronic request (e.g., IT request), the entity server transmits the electronic request to one or more electronic devices to satisfy the request. Typically, the entity server may route the electronic request to at least one particular electronic device among the multiple electronic devices of a particular advisor or other specialist. Conventional software solutions utilize a randomization method where the electronic requests are allocated among the multiple electronic devices at random. However, it has been observed that such randomization method may lead to covariate imbalance. For instance, a process of standard randomized distribution of the electronic requests to a plurality of electronic devices of a plurality of advisors may not achieve a good balance for the covariates of distributed advisors. In order to have a more uniform distribution of the electronic requests among the multiple electronic devices, the conventional software solutions continuously perform the standard randomization process described above (e.g., tens or hundreds of times or randomization to achieve the desired balance). However, this standard randomization process consumes vast computing power and is not timely.

SUMMARY

What is therefore needed is an electronic device allocation system that may enable a balanced distribution of electronic requests among multiple electronic devices in terms of both covariates and composite funds without consuming vast computing power. What is further needed is an electronic device allocation method of the electronic requests among the multiple electronic devices that can provide timely and accurate results.

An electronic device allocation system may enable a balanced distribution of a plurality of advisors operating a plurality of advisor electronic computing devices into at least a treatment group and a control group by balancing distribution of covariates corresponding to the plurality of advisors into at least the treatment group and the control group. The electronic device allocation system may also enable the balanced distribution of the plurality of advisors operating the plurality of advisor electronic computing devices into the multiple groups, such as the treatment group and the control group based on minimum value of a Mahalanobis Distance between each covariate of the plurality of advisors.

In one embodiment, a server-implemented method for iteratively routing a plurality of electronic requests to a plurality of computing devices, each computing device represented by a data record, the server-implemented method comprises in response to receiving the plurality of electronic requests from a plurality of customer devices, selecting, by a server, a first data record representing a first computing device from a first group and a second data record representing a second computing device from a second group; generating, by the server, a probability value based on a Mahalanobis Distance between each covariate of one or more covariates of a first user operating the first computing device and a second user operating the second computing device; upon the server determining that the probability value is greater than a predetermined threshold, authorizing, by the server, an association of the first data record with the second group instead of the first group and an association of the second data record with the first group instead of the second group; upon the server determining that the probability value is less than the predetermined threshold, restoring, by the server, the first data record representing the first computing device and the second data record representing the second computing device in the first and second groups, respectively; and routing, by the server, each of the plurality of electronic requests to the plurality of computing devices in each of the first group and the second group.

In another embodiment, a server-implemented method for iteratively routing a plurality of electronic requests to a plurality of computing devices is disclosed. Each computing device being associated with a geographic region and comprising a data record. The server-implemented method may include in response to receiving the plurality of electronic requests from a plurality of customer devices, randomly selecting, by a server, the data record of a first computing device from at least one of a plurality of groups; upon the server determining that the data record of the first computing device is selected from a first group: randomly selecting, by the server, a data record of a second computing device associated with a same geographical region from a second group or a third group; upon the server determining that the data record of the second computing device is not selected from the second group, transmitting, by the server, the data record of the second computing device into the first group and assign the data record of the first computing device as unselected; and upon the server determining that the data record of the second computing device is selected from the second group, updating, by the server, the group associated with the data record of the first computing device from the first group to the second group and the group associated with the data record of the second computing device from the second group to the first group; upon the server determining that the data record of the first computing device is not selected from the first group: randomly selecting, by the server, the data record of the second computing device associated with the same geographical region from the first group or the third group; upon the server determining that the data record of the second computing device is not selected from the first group, transmitting, by the server, the data record of the second computing device into the second group and mark the data record of the first computing device as unselected; and upon the server determining that the data record of the second computing device is selected from the first group, updating, by the server, the group associated with the data record of the first computing device from the first group to the second group and the group associated with the data record of the second computing device from the second group to the first group; calculating, by the server, a probability value for determining whether to update of the group associated with the data record of the first computing device from the first group to the second group and the group associated with the data record of the second computing device from the second group to the first group based on a Mahalanobis Distance between each covariate of one or more covariates of a first user operating the first computing device and a second user operating the second computing device; upon the server determining that the probability value is greater than a predetermined threshold: authorizing, by the server, the update of the group associated with the data record of the first computing device from the first group to the second group and the group associated with the data record of the second computing device from the second group to the first group; upon the server determining that the probability value is less than the predetermined threshold: restoring, by the server, the data record of the first computing device and the data record of the second computing device in their original groups; and routing, by the server, each of the plurality of electronic requests to each of the plurality of computing devices corresponding to information associated with users in each of the first group and the second group.

In yet another embodiment, a system for iteratively routing a plurality of electronic requests to a plurality of computing devices is disclosed. Each computing device being associated with a geographic region and comprising a data record. The system may include a server, wherein with each iteration the server is configured to: in response to receiving the plurality of electronic requests from a plurality of customer devices, randomly select the data record of a first computing device from at least one of a plurality of groups; upon the server determining that the data record of the first computing device is selected from a first group: randomly select a data record of a second computing device associated with a same geographical region from a second group or a third group; upon the server determining that the data record of the second computing device is not selected from the second group, transmit the data record of the second computing device into the first group and assign the data record of the first computing device as unselected; and upon the server determining that the data record of the second computing device is selected from the second group, update the group associated with the data record of the first computing device from the first group to the second group and the group associated with the data record of the second computing device from the second group to the first group; upon the server determining that the data record of the first computing device is not selected from the first group: randomly select the data record of the second computing device associated with the same geographical region from the first group or the third group; upon the server determining that the data record of the second computing device is not selected from the first group, transmit the data record of the second computing device into the second group and mark the data record of the first computing device as unselected; and upon the server determining that the data record of the second computing device is selected from the first group, update the group associated with the data record of the first computing device from the first group to the second group and the group associated with the data record of the second computing device from the second group to the first group; calculate a probability value of authorizing the update of the group associated with the data record of the first computing device from the first group to the second group and the data record associated with the second computing device from the second group to the first group based on a Mahalanobis Distance between each covariate of one or more covariates of a first user operating the first computing device and a second user operating the second computing device; upon the server determining that the probability value is greater than a predetermined threshold: authorize the update of the group associated with the data record of the first computing device from the first group to the second group and the group associated with the data record of the second computing device from the second group to the first group; upon the server determining that the probability value is less than the predetermined threshold: restore the data record of the first computing device and the data record of the second computing device in their original groups; and route each of the plurality of electronic requests to each of the plurality of computing devices corresponding to information associated with users in each of the first group and the second group.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
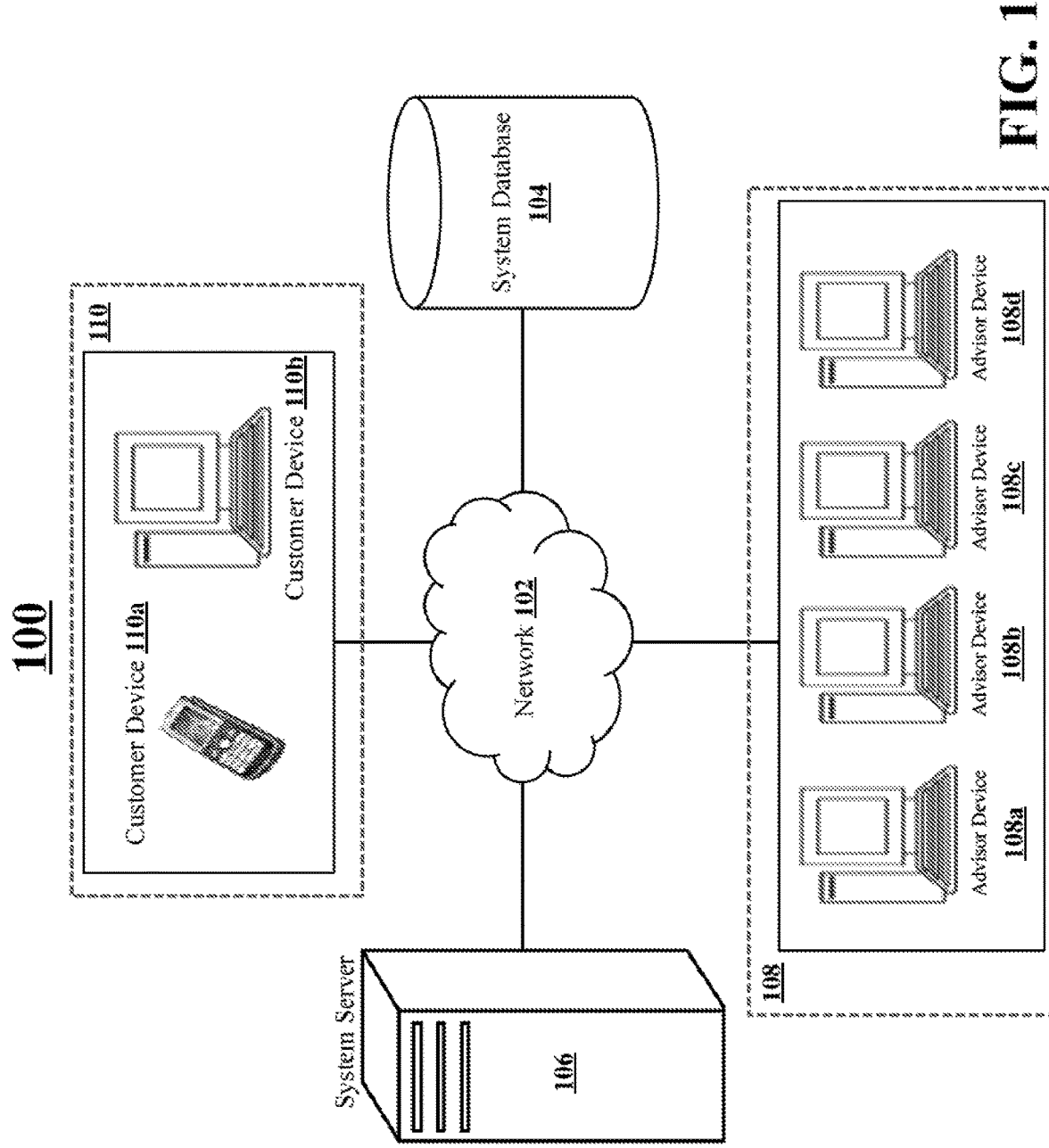
FIG. 1 shows an architecture for an advisor distribution system for a balance distribution of a plurality advisor devices being operated by a plurality of advisors, according to an embodiment.

Reference will now be made to the embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments in the drawings, which form a part here. Other embodiments may be used and/or other changes may be made without departing from the spirit or scope of the present disclosure. The embodiments described in the detailed description are not meant to be limiting of the subject matter presented here.

FIG. 1 shows an advisor distribution system 100. The advisor distribution system 100 may include a system database 104, a system server 106, advisor devices 108, and customer devices 110. The advisor distribution system 100 may be configured to balance covariates associated with the advisor devices 108 of advisors when distributed between multiple groups, such as a control group and a treatment group.

The advisor distribution system 100 is described in a context of server-executable instructions, such as program modules being executed by the system server 106. The program modules may include programs, objects, components, and data structures. The program modules may execute particular tasks associated with the balanced distribution of the advisors operating the advisor devices 108 into at least the treatment group and the control group by balancing the distribution of the covariates corresponding to the advisors into at least the treatment group and the control group. The features of the advisor distribution system 100 may be practiced in a single system server 106 environment. The features of the advisor distribution system 100 may be practiced in a distributed server environment where the tasks may be performed by multiple server computers, which are linked through a network 102. In a distributed server environment, the program modules may be located in both local and remote storage media including memory storage devices.

The system database 104, the system server 106, the advisor devices 108, and the customer devices 110 may dynamically interact with each other through the network 102. The network 120 may include, but is not limited to, a private local area network or a public local area network, a wireless local area network, a metropolitan area network, a wide-area network, and Internet. The network 120 may further include both wired and wireless communications, according to one or more standards, via one or more transport mediums. The communication over the network 120 may be performed in accordance with various communication protocols, such as, a transmission control protocol and an internet protocol, a user datagram protocol, and an institute of electrical and electronics engineers communication protocols. The network 120 may further include wireless communications, according to Bluetooth specification sets, or another standard or proprietary wireless communication protocol. The network 120 may further include communications over a cellular network, including, for example, a global system for mobile communications, code division multiple access, and enhanced data for global evolution network.

A system server 106 is a computing device including a processing unit. The processing unit may include a processor with computer-readable medium, such as a random access memory coupled to the processor. The system server 106 may be running algorithms or computer executable program instructions, which may be executed by a single processor or multiple processors in a distributed configuration. The system server 106 may interact with one or more software modules of a same or a different type operating within the advisor distribution system 100.

Non-limiting examples of the system server 106 may include a server computer, a workstation computer, a tablet device, and a mobile device. Non-limiting examples of the processor associated with the system server 106 may include a microprocessor, an application specific integrated circuit, and a field programmable object array, among others.

The system server 106 may include an interactive user interface through which a system administrator may interact with or execute the one or more software modules operating within the advisor distribution system 100 via an input device, such as a touch screen, a mouse, a keyboard, a keypad, and others. During the interaction process, the system server 106 may receive, process, and/or transmit digital data associated with the tasks. In addition, the user interface may be configured to collect information from the system database 104 and present the information on the user interface. The user interface may further be configured to feed the information to the advisors or the customers interacting with the system server 106 or any other servers directly or indirectly associated with the system server 106.

The system server 106 may be configured for a balanced distribution of the advisor devices 108 operated by the advisors into the multiple groups. The multiple groups may include the treatment group and the control group. In one embodiment, the system server 106 may perform the balanced distribution of the advisor devices 108 operated by the advisors into the multiple groups, such as the treatment group and the control group in terms of distribution of composite funds of the advisors. In another embodiment, the system server 106 may perform the balanced distribution of the advisor devices 108 operated by the advisors into the multiple groups, such as the treatment group and the control group in terms of distribution of covariates of the advisors. For example, each advisor may have at least one covariate. The at least covariate for each advisor may be a redemption value in previous one year corresponding to each advisor.

Initially, the system server 106 may execute a standard randomization algorithm to distribute the advisor devices 108 operated by the advisors into multiple groups. Such distribution of the advisor devices 108 operated by the advisors into the multiple groups may not achieve a good balance for the distribution of the covariates of the distributed advisors into the multiple groups. The system server 106 may then execute a re-randomization algorithm to achieve a balanced distribution of the covariates for the advisor devices 108 operated by the advisors into the multiple groups. The execution of the re-randomization algorithm may redo the initial randomization distribution of the advisor devices 108 operated by the advisors into the multiple groups. For instance, the execution of the re-randomization algorithm may redo the initial randomization distribution of the advisor devices 108 operated by the advisors into the multiple groups until a predetermined balancing criteria is satisfied.

The system server 106 may use a Mahalanobis distance as a metric to measure reasonable balancing of the distribution of the covariates associated with advisors operating the advisor devices 108 into the multiple groups. For instance, the system server 106 may use the Mahalanobis distance as a metric to measure reasonable balancing of the distribution of the covariates of the advisors operating the advisor devices 108 into the multiple groups as the Mahalanobis distance is a scaled distance by a covariance matrix. The system server 106 may calculate a mean difference value of the covariates of the advisors operating the advisor devices 108 distributed in the multiple groups, such as the treatment and control groups. The mean different value of the covariates of the advisors operating the advisor devices 108 is a multivariate random variable whose mean is equal to zero. The system server 106 may derive the covariance matrix under pure randomization assumption. Thus, for any random distribution of the advisors operating the advisor devices 108 into the multiple groups, the system server 106 may the calculate Mahalanobis distance between observed mean covariate difference to covariate underlying distribution under a pure randomization assumption. The system server 106 may then be able to balance the distribution of the covariates of the advisors operating the advisor devices 108 as the value of the Mahalanobis distance is decreased. Accordingly, when the Mahalanobis distance decreases, the system server 106 may achieve a balanced distribution of covariates corresponding to the plurality of advisors operating the plurality of advisor devices 108 into the multiple groups.

The system server 106 may be associated with several modules, such as an authentication module and a data processing module. The authentication module may receive credentials of the customers through the customer devices 110. The authentication module may process and validate the credentials of the customers in order to provide permission to the customers for accessing, starting, editing, and managing records of the advisors. The data processing module may be configured to automatically retrieve information requested by the customer devices 110 from the system database 104. The data processing module may then present the retrieved information requested by the customer devices 110 on a display screen of the customer devices 110. The system server 106 may further be associated with a module manager, which may interact with the modules in addition to controlling the operation of advisor distribution system 100 and processing the electronic requests from the customer devices 110.

Advisor devices 108 may be electronic computing devices operated by the advisors. Each advisor device 108 may include a processing unit. The processing unit may include a processor with computer-readable medium, such as a random access memory coupled to the processor. Each advisor device 108 may be running algorithms or computer executable program instructions, which may be executed by a single processor or multiple processors in a distributed configuration. Each advisor device 108 may be configured to interact with one or more software modules of a same or a different type operating within the advisor distribution system 100.

Non-limiting examples of each advisor device 108 may include a server computer, a computing device, a workstation computer, a tablet device, and a mobile device. Non-limiting examples of the processor associated with each advisor device 108 may include a microprocessor, an application specific integrated circuit, and a field programmable object array, among others. For ease of explanation, FIG. 1 shows four advisor devices 108, such as 108*a*, 108*b*, 108*c*, and 108*d* functioning as the advisor devices 108 for four advisors. However, it should be appreciated that some embodiments may include any number of the advisor devices 108 capable of performing the various tasks described herein.

The advisors operating the advisor devices 108 may be users or firms providing one or more customer services. A record of each advisor may be stored in the system database 104. A record of each advisor may include one or more covariates corresponding to the advisor. The one or more covariates for each advisor may correspond to one or more control characteristics. In one embodiment, a control characteristic for each advisor may include identification information of the advisor. In another embodiment, the control characteristic for each advisor may include geographic location information of the advisor.

The one or more covariates for each advisor may also correspond to one or more control variables. In one embodiment, a control variable for each advisor may include a value of a redemption rate for a predefined period of time of the advisor. The redemption rate may be of managed customer accounts by the advisor. In another embodiment, the control variable for each advisor may include a value of all assets (for example, mutual funds or bonds) managed the advisor. In yet another embodiment, the control variable for each advisor may include a value of all sales of customer products of the advisor. In yet another embodiment, the control variable for each advisor may include a predicted spike probability value of the advisor.

Customer devices 110 may be computing devices operated by the customers. Each customer device 110 may include a processing unit. The processing unit may include a processor with computer-readable medium, such as a random access memory coupled to the processor. Each customer device 110 may be running algorithms or computer executable program instructions, which may be executed by a single processor or multiple processors in a distributed configuration. Each customer device 110 may be configured to interact with one or more software modules of a same or a different type operating within the advisor distribution system 100.

Non-limiting examples of each customer device 110 may include a server computer, a workstation computer, a tablet device, and a mobile device. Non-limiting examples of the processor associated with each customer devices 110 may include a microprocessor, an application specific integrated circuit, and a field programmable object array, among others. For ease of explanation, FIG. 1 shows two customer devices 110, such as a telephone 110*a* (e.g., a landline telephone, a cellular telephone, a smartphone) and a customer computer 110*b* (e.g., a desktop computer, a laptop, a server, a tablet) functioning as the customer devices 110 for two customers. However, it should be appreciated that some embodiments may comprise any number of the customer devices 110 capable of performing the various tasks described herein.

The customer devices 110 may include interactive graphical user interfaces through which the customers may interact via an input device. The customer devices 110 operated by the customers may be directly or indirectly associated with the advisor devices 108 to avail one or more services/products from the advisors operating the advisor devices 108. The customer devices 110 may be associated with the advisor devices 108 via the system server 106. The system server 106 may distribute the multiple advisors operating the advisor devices 108 into the multiple groups, and notify the customers regarding information associated with each group and the information associated with each advisor within each group though electronic communication.

The customer devices 110 may execute an Internet browser or a local web application that access the system server 106 in order to issue requests or instructions to the system server 106 to access the data corresponding to the advisors operating the advisor devices 108 in the multiple groups, such as the treatment group and the control group. The customer devices 110 may transmit the credentials from customer inputs to the system server 106, from which the system server 106 may authenticate the customers and, in some implementations, determine each customer profile. The customer devices 110 may include a number of input devices configured to receive a number of data inputs (e.g., mouse, keyboard, touchscreen, stylus), including various types of data inputs allowing for authentication, e.g., username, passwords, certificates, biometrics.

As one example of each customer device 110 operation, each customer device 110 may receive an electronic communication from the system server 106 regarding a website hosted by the system server 106 that provides real-time information associated with each group and each advisor within each group, and thereby allowing for the customers to access the data on the advisor devices 108 within each of the groups. Using the customer devices 110, the customers may select one or more advisor devices 108 being operated by one or more advisors within one of the groups on a customer-centric website. As the selection process proceeds, the customer devices 110 of the customers may be used to download machine-readable computer files (e.g., PDF, DOC, XSL) containing the data, such as asset data from the advisor devices 108. The computer files may be stored into document records in the system database 104. The customer devices 110 may issue queries or instructions to the system server 106 via webpages generated by a webserver, which may then instruct the system server 106 to perform various tasks, such as retrieving or updating a file from the system database 104.

As another example of each customer device 110 operation, each customer device 110 may execute an Internet browser that accesses the system server 106 hosting the website that allows for the customers to access the data on the advisor devices 108 within each of the groups. Using the customer devices 110, the customers may select the one or more advisor devices 108 being operated by the one or more advisors within one of the groups on the customer-centric website. As the selection process proceeds, the customer devices 110 of the customers may be used to download machine-readable computer files (e.g., PDF, DOC, XSL) containing the assets information from the advisor devices 108. The computer files may be stored into document records in the system database 104. The customer devices 110 may issue the queries or the instructions to the system server 106 via the webpages generated by the webserver, which may then instruct the system server 106 to perform the various tasks, such as retrieving or updating the file from the system database 104.

The customer devices 110 may be associated with the advisor devices 108 via customer service representative (CSR) computers. A CSR computer may be a computing device including a processor and capable of performing the various processes and tasks described herein. The CSR computer may be coupled to a helpdesk software, such as a queuing system such that the CSR computer allows a CSR to interact with a caller (for example, a customer) over a phone, but can also capture telephony information regarding an ongoing call. The CSR computer may produce an interactive graphical user interface that allows the CSR to navigate financial service account information for the caller from the advisor devices 108, if the caller is an authenticated customer, and may allow the CSR to generate, update, and monitor records of the callers.

The CSR computers may generate a session record for a web-based interaction between the customer devices 110 of the customers and the advisor devices 108 of the advisors. The system server 106 may function as the CSR computer to generate the session record for the web-based interaction between the customer devices 110 and the advisor devices 108. The session record may include one or more attributes containing data fields related to the web-based interaction, such as a session identifier, a timestamp, a customer identifier, and a source device identifier information uniquely identifying the customer devices 110 (e.g., IP address, MAC address). The CSR computers may capture the data for the web-based interaction between the customer devices 110 and the advisor devices 108 at different times of the web-based interactions, such as capturing the source device information from header portions of IP packets or the customer identifier information from an authentication attempt. In some instances, the web-based interaction between the customer devices 110 and the advisor devices 108 may transition between channels. For example, the web-based interaction may begin when the customer operating the customer device 110a upon receiving from the system server 106 a hyperlink containing information associated with the advisors in one or more groups may select the hyperlink, and is properly authenticated as the customer. The CSR computers may gather the session record that may contain the data gathered through the web-based interactions from the customer devices 110 and the telephone-based interaction via the CSR computer with the advisor devices 108. The CSR computers may store the session records locally or in any database hosted on any server within the network 102.

A system database 104 may be capable of storing data records in a plain format and an encrypted version. The data records may include data generated by one or more software modules operated by the system server 106, data and files associated with a customer, data and files associated with an advisor, and credentials of each authorized customer of a company to allow each authorized customer to access electronic devices of the advisor distribution system 100, among others. The system database 104 may further include allocation files and/or distribution files, which are records that store information about advisor distribution algorithms, sub-applications associated with the advisor distribution algorithms, among other information.

The system database 104 may be in communication with the system server 106, the advisor devices 108, and the customer devices 110. In one embodiment, the system database 104 may be a part of the system server 106 and/or the system database 104 may be a separate component in communication with the system server 106. In another embodiment, the system database 104 may be a part of the customer devices 110 and/or the system database 104 may be a separate component in communication with the customer devices 110. In yet another embodiment, the system database 104 may be a part of the advisor devices 108 and/or the system database 104 may be a separate component in communication with the advisor devices 108.

The system database 104 may have a logical construct of the data files and the records, which are stored in a non-transitory machine-readable storage media, such as a hard disk or memory, controlled by software modules of a database program (e.g., SQL), and a database management system that executes the code modules (e.g., SQL scripts) for various data queries and management functions. The system database 104 may be implemented through database management systems (DBMS), such as MySQL, PostgreSQL, SQLite, Microsoft SQL Server, Microsoft Access, Oracle, SAP, FoxPro, IBM DB2, FileMaker Pro, and any other type of database that may organize collections of data.

Figure 2A:
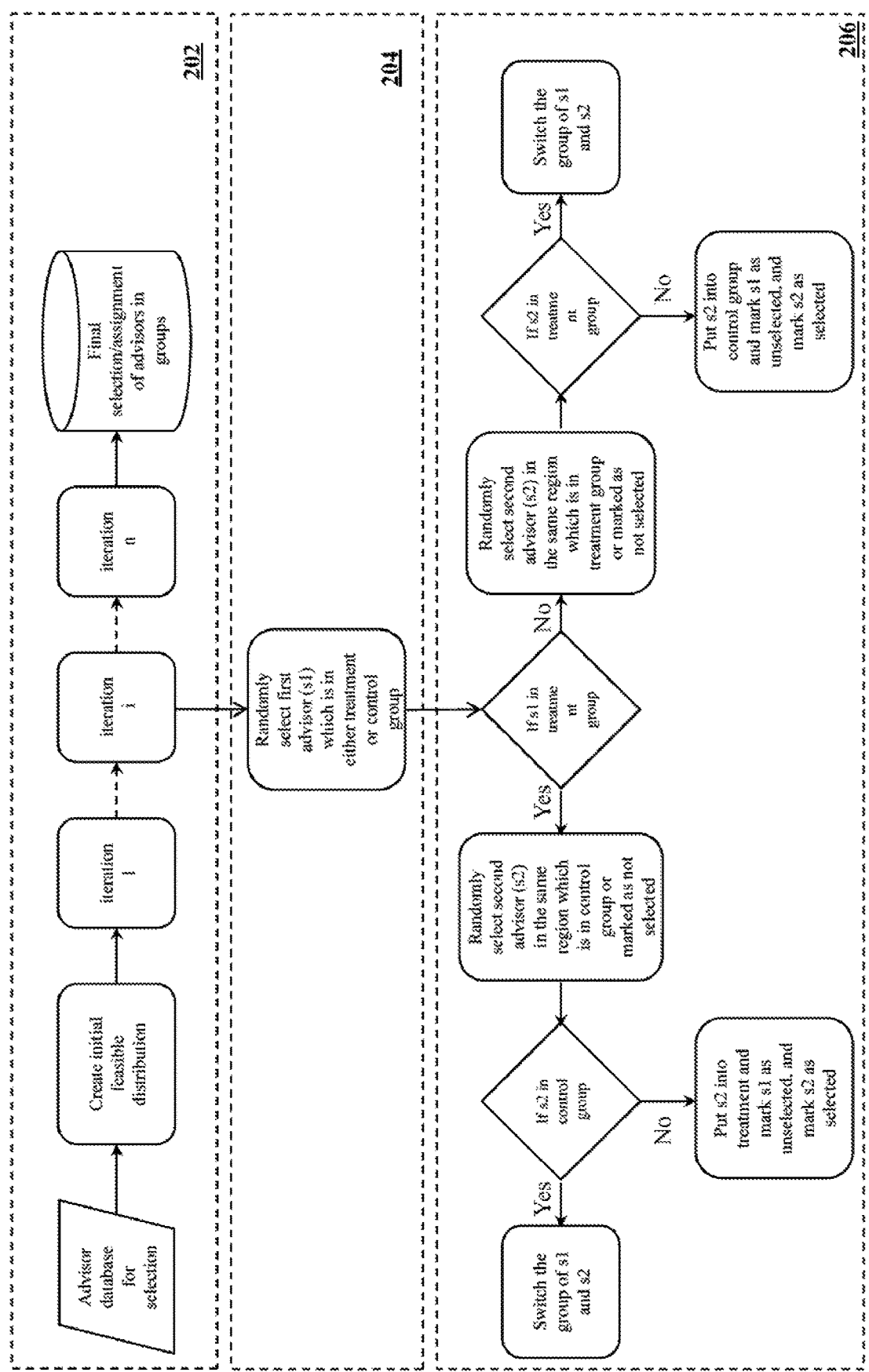
FIG. 2A is a flowchart of a method for a balance distribution of a plurality advisor devices being operated by a plurality of advisors, according to another embodiment.
Figure 2B:
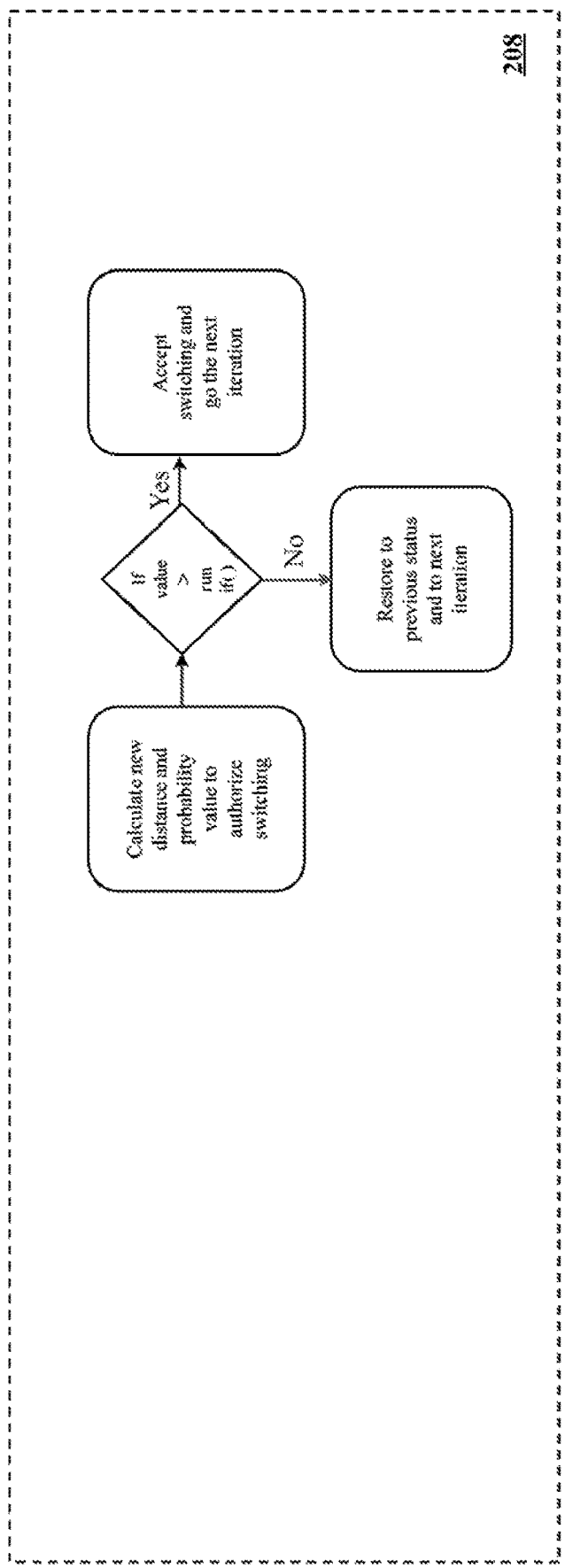
FIG. 2B is a flowchart of a method for a balance distribution of a plurality advisor devices being operated by a plurality of advisors, according to another embodiment.
Figure 3:
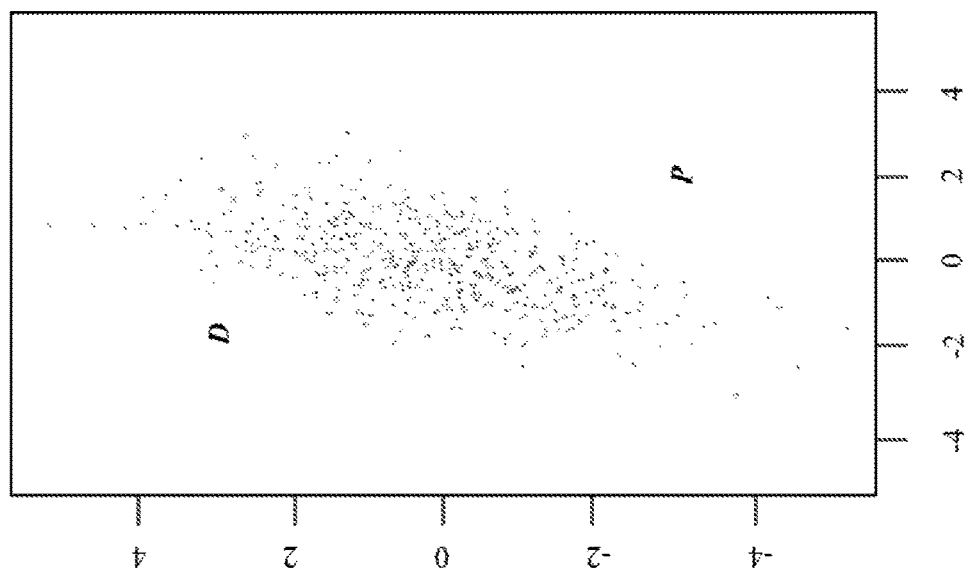
FIG. 3 shows a graph, according to an embodiment.

FIGS. 2A and 2B shows execution steps of a balance distribution of a plurality advisor devices being operated by a plurality of advisors, according to a method. Method for a task of the balance distribution of the plurality advisor devices may be executed, for example, by an advisor distribution system as shown in FIG. 1, which may include different components that may dynamically interact with each other through network connections. The method shown in FIGS. 2A and 2B may include execution steps 202, 204, 206, and 208. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method of FIGS. 2A and 2B is described as being executed by a single server computer, referred to as a system server in this embodiment. However, one having skill in the art will appreciate that, in some embodiments, the steps may be executed by a number of server computing devices operating in a distributed computing environment. In some cases, a server computer executing one or more steps may be programmed to execute various other, unrelated features, where such server computer does not need to be operating strictly as the system server described herein.

The method may start at step 202, where a server may receive a plurality of electronic requests from a plurality of customer devices for routing the plurality of electronic requests to a plurality of advisor computing devices. In response to receiving the plurality of electronic requests from the plurality of customer devices, the server may access a data record of a plurality of advisors operating the plurality of advisor computing devices stored in a non-transitory data storage device, such as an advisor database. Each advisor computing device and/or an associated advisor may have the data record. The data record may include information associated with the advisor computing device and/or the advisor.

The server may initially generate and store the data record associated with the plurality of advisors operating the plurality of advisor computing devices in the non-transitory data storage device. The data record associated with each advisor operating the advisor computing device may be associated with one or more covariates. Covariates may be characteristics (excluding an actual treatment) of the advisors taken into consideration while executing the task of the distribution of the advisors operating the advisor computing devices in multiple groups. The server may collect data on the characteristics associated with the advisors operating the advisor computing devices before execution of the task, and store the data in a system database.

One or more covariates for each advisor operating the advisor computing device may correspond to one or more control variables. In one embodiment, a control variable for each advisor operating the advisor computing device may include a value of a redemption rate for a predefined period of time associated with the advisor or a firm associated with the advisor. In another embodiment, a control variable for each advisor operating the advisor computing device may further include a value of all assets (for example, bonds and funds) associated with the advisor or the firm associated with the advisor. In yet another embodiment, a control variable for each advisor operating the advisor computing device may further include a value of all sales of products and services by the advisor or the firm associated with the advisor. In yet another embodiment, a control variable for each advisor operating the advisor computing device may further include a predicted spike probability value associated with the advisor or the firm associated with the advisor.

The server may execute a selection protocol to select the data record of each of a subset of advisors operating a subset of advisor computing devices from the plurality of advisors. In one embodiment, the server may randomly select the data record of each of the subset of advisors operating the subset of advisor computing devices from the plurality of advisors. In another embodiment, the server may select the data record of each of the subset of advisors operating the subset of advisor computing devices from the plurality of advisors based on one or more predefined criteria. The one or more predefined criteria may be an input to the selection protocol. For instance, the server may select the data record of each of the subset of advisors operating the subset of advisor computing devices from the plurality of advisors based on a value of predicted risks. The one or more predefined criteria may include the value of the predicted risks. In one non-limiting example, the server may select the data record of each of the subset of advisors operating the subset of advisor computing devices from the plurality of advisors having a highest value of predicted risks.

Upon the selection of the data record of each of the subset of advisors based on any or no criteria, the server may execute a distribution protocol to randomly distribute the data record of each of the subset of advisors operating the subset of advisor computing devices into a plurality of groups. For instance, the server may randomly distribute the data record of each of the subset of advisors operating the subset of advisor computing devices into a first group and a second group. The first group may correspond to a treatment group. The second group may correspond to a control group. The control group may be used as a baseline measure. The control group may be identical to all other items that are being examined with the exception that the control group does not receive the treatment or the experimental manipulation that the treatment group receives. The treatment group is the item or subject that is manipulated. The treatments may be applied to experimental items in the treatment group(s). In comparative experiments, members of the complementary group, the control group, receive either no treatment or a standard treatment.

The server may select the data record of each of a second subset of advisors operating a second subset of advisor computing devices from remaining number of advisors. Similar to initial selection process, the server may execute the selection protocol to randomly select the data record of each of the second subset of advisors operating the second subset of advisor computing devices from the remaining number of advisors. In another embodiment, the server may select the data record of each of the second subset of advisors operating the second subset of advisor computing devices from the remaining number of advisors based on a predefined criteria. The server may continue iterative selection and distribution process of the data record of each of the advisors operating the advisor computing devices into the plurality of groups, such as the treatment group or the control group until each and every data record of each advisor operating advisor computing device is randomly assigned into at least one of the plurality of groups. Once each and every data record of each advisor operating advisor computing device is assigned into at least one of the plurality of groups, the server may then generate an assignment record of assignment of each data record of each advisor operating advisor computing device into a given group, and store the assignment record for each advisor group in a system database.

At step 204, the server may randomly select the data record of a first advisor operating a first advisor computing device from at least one of the plurality of groups. The first advisor operating the first advisor computing device may be associated with a first geographical region. In one embodiment, the server may generate and execute a random selection algorithm, which may lead to the random selection of the data record of the first advisor operating the first advisor computing device from the at least one of the plurality of groups. In another embodiment, the server may generate and transmit instructions to a module, such as a random selection module for the random selection of the data record of the first advisor operating the first advisor computing device from the at least one of the plurality of groups.

Upon the random selection of the data record of the first advisor operating the first advisor computing device from the at least one of the plurality of groups, the server may determine a group of the plurality of groups from which the data record of the first advisor operating the first advisor computing device is selected. The server may particularly determine whether the data record of the first advisor operating the first advisor computing device is selected from the treatment group or the control group.

At step 206, the server upon determining that the data record of the first advisor operating the first advisor computing device is selected from the treatment group, the server may randomly select the data record of a second advisor operating a second advisor computing device associated with a same geographical region (as of a first advisor operating the first advisor computing device) from at least one of the plurality of groups except the treatment group. For instance, the server upon determining that the data record of the first advisor operating the first advisor computing device is selected from the treatment group, the server may randomly select the data record of the second advisor operating the second advisor computing device associated with the first geographical region from a control group or a third group (for example, an unselected group). In one embodiment, the server may generate and execute a selection algorithm, which may lead to a selection of the data record of the second advisor operating the second advisor computing device from the at least one of the plurality of groups except the treatment group. In another embodiment, the server may generate and transmit instructions to a module, such as a selection module for a selection of the data record of the second advisor operating the second advisor computing device from the at least one of the plurality of groups except the treatment group.

Upon the selection of the data record of the second advisor operating the second advisor computing device from the at least one of the plurality of groups except the treatment group, the server may determine a group from the plurality of groups (except the treatment group) from which the data record of the second advisor operating the second advisor computing device is selected from. The server may particularly determine whether the data record of the second advisor operating the second advisor computing device is selected from the control group or not.

The server upon determining that the data record of the second advisor operating the second advisor computing device is selected from the control group, the server may initiate switching of the group of the data record of the first advisor operating the first advisor computing device and the data record of the second advisor operating the second advisor computing device from the treatment group to the control group or vice-versa. In some embodiments, the server upon determining that the data record of the second advisor operating the second advisor computing device is selected from the control group, the server may update the group of the data record of the first advisor operating the first advisor computing device and the data record of the second advisor operating the second advisor computing device from the treatment group to the control group or vice-versa.

The server upon determining that the data record of the second advisor operating the second advisor computing device is not selected from the control group, the server may transmit a record of the data record of the second advisor operating the second advisor computing device into the treatment group. In another embodiment, the server upon determining that the data record of the second advisor operating the second advisor computing device is not selected from the control group, the server may tag or mark the data record of the first advisor operating the first advisor computing device as unselected and the data record of the second advisor operating the second advisor computing device as selected in the data records of all the advisors operating the advisor computing devices stored in the system database. In yet another embodiment, the server upon determining that the data record of the second advisor operating the second advisor computing device is not selected from the control group, the server may designate the data record of the first advisor operating the first advisor computing device as unselected and transmit the data record of the first advisor into an unselected group, and the data record of the second advisor operating the second advisor computing device as selected in the data record of the second advisor stored in the system database.

The server upon determining that the data record of the first advisor operating the first advisor computing device is not selected from the treatment group, the server may randomly select the data record of the second advisor operating the second advisor computing device associated with a same geographical region (as of a first advisor) from at least one of the plurality of groups except the control group. For instance, the server upon determining that the data record of the first advisor operating the first advisor computing device is not selected from the treatment group, the server may select the data record of the second advisor operating the second advisor computing device associated with the first geographical region from the treatment group or a third group (for example, an unselected group). In one embodiment, the server may generate and execute a selection program, which may lead to a selection of the data record of the second advisor operating the second advisor computing device from the at least one of the plurality of groups except the control group. In another embodiment, the server may generate and transmit instructions to a module, such as a selection module for the selection of the data record of the second advisor operating the second advisor computing device from the at least one of the plurality of groups except the control group.

Upon the selection of the data record of the second advisor operating the second advisor computing device from the at least one of the plurality of groups except the control group, the server may determine a group from the plurality of groups (except the control group) from which the data record of the second advisor operating the second advisor computing device is selected from. The server may particularly determine whether the data record of the second advisor operating the second advisor computing device is selected from the treatment group or not.

The server upon determining that the data record of the second advisor operating the second advisor computing device is selected from the treatment group, the server may initiate switching of the group of the data record of the second advisor operating the second advisor computing device and the data record of the first advisor operating the first advisor computing device from the treatment group to the control group or vice-versa.

The server upon determining that the data record of the second advisor operating the second advisor computing device is not selected from the treatment group, the server may transmit the data record of the second advisor operating the second advisor computing device into the control group. In another embodiment, the server upon determining that the data record of the second advisor operating the second advisor computing device is not selected from the treatment group, the server may tag or mark the data record of the first advisor operating the first advisor computing device as unselected and the data record of the second advisor operating the second advisor computing device as selected in the data records of all the advisors stored in the system database.

In yet another embodiment, the server upon determining that the data record of the second advisor operating the second advisor computing device is not selected from the treatment group, the server may designate the data record of the first advisor operating the first advisor computing device as unselected and transmit the data record of the first advisor into an unselected group, and the data record of the second advisor operating the second advisor computing device as selected in the data record of the second advisor stored in the system database.

At step 208, the server may calculate a distance based on Mahalanobis Distance between each covariate of one or more covariates associated with the data record of the first advisor operating the first advisor computing device and the data record of the second advisor operating the second advisor computing device. The Mahalanobis distance may be a measure of a distance between a point P and a distribution D (as depicted in FIG. 4). In one embodiment, the distribution D may illustrate the distribution of the covariates of all the data records of the advisors operating the advisor computing devices in all the groups whereas the point P may illustrate a particular covariate of a particular advisor. In another embodiment, the distribution D may illustrate the distribution of the covariates of all the data records of the advisors operating the advisor computing devices in the treatment group whereas the point P may illustrate the particular covariate of the data record of the particular advisor in the control group. In yet another embodiment, the distribution D may illustrate the distribution of the covariates of all the data records of the advisors operating the advisor computing devices in the control group whereas the point P may illustrate the particular covariate of the data record of the particular advisor in the treatment group.

The Mahalanobis distance may be a multi-dimensional summary of measuring how many standard deviations away P is from the mean of D. The distance is zero if P is at the mean of D and grows as P moves away from the mean. Along each principal component axis, the Mahalanobis distance measures the number of standard deviations from P to the mean of D. If each of the axes is rescaled to have unit variance, then Mahalanobis distance corresponds to standard Euclidean distance in the transformed space. The Mahalanobis distance is unit less and scale-invariant, and takes into account the correlations of the advisor data set. In some embodiments, the Mahalanobis distance is preserved under full-rank linear transformations of the space spanned by the advisor data. For instance, if the advisor data has a nontrivial null space, then the Mahalanobis distance can be computed after projecting the advisor data (non-degenerately) down onto any space of the appropriate dimension for the advisor data.

The server may calculate a probability value by executing a protocol. One of the inputs to the protocol may be the Mahalanobis Distance between each covariate of the one or more covariates associated with the data record of the first advisor operating the first advisor computing device and the data record of the second advisor operating the second advisor computing device. In another embodiment, the server may calculate the probability value using a formula having one of the variables as the Mahalanobis Distance between each covariate of the one or more covariates associated with the data record of the first advisor operating the first advisor computing device and the data record of the second advisor operating the second advisor computing device.

The server may use the probability value to authorize the switching of the group of the data record of the first advisor operating the first advisor computing device and the data record of the second advisor operating the second advisor computing device from the treatment group to the control group or vice-versa. In some embodiments, the server may use the probability value to update the group of the data record of the first advisor operating the first advisor computing device and the data record of the second advisor operating the second advisor computing device from the treatment group to the control group or vice-versa. The server may match the probability value with a predetermined threshold. The server may analyze a result of the matching of the probability value with the predetermined threshold. Based on the result of the matching, the server may authorize switching of the group of the data record of the first advisor operating the first advisor computing device and the data record of the second advisor operating the second advisor computing device from the treatment group to the control group or vice-versa. In some embodiments, based on the result of the matching, the server may update the group of the first advisor operating the first advisor computing device and the second advisor operating the second advisor computing device from the treatment group to the control group or vice-versa. In some other embodiments, the server may not authorize the switching of the group of the data record of the first advisor operating the first advisor computing device and the data record of the second advisor operating the second advisor computing device from the treatment group to the control group or vice-versa.

When the probability value is greater than the predetermined threshold, the server may authorize the switching of the group of the data record of the first advisor operating the first advisor computing device and the data record of the second advisor operating the second advisor computing device from the treatment group to the control group or vice-versa. The server may execute one or more authorization instructions for the switching of the group of the data record of the first advisor operating the first advisor computing device and the data record of the second advisor operating the second advisor computing device from the treatment group to the control group or vice-versa. Upon the execution of authorization instructions, the switching of the group of the data record of the first advisor operating the first advisor computing device and the data record of the second advisor operating the second advisor computing device from the treatment group to the control group or vice-versa is completed. In some other embodiments, when the probability value is greater than the predetermined threshold, the server may update the group of the data record of the first advisor operating the first advisor computing device and the data record of the second advisor operating the second advisor computing device from the treatment group to the control group or vice-versa. The server may generate a final record of a current placement of the data record of the first advisor and the data record of the second advisor in their updated groups, and store the final record in the system database.

When the probability value is less than the predetermined threshold, the server may not authorize the switching of the group of the data record of the first advisor operating the first advisor computing device and the data record of the second advisor operating the second advisor computing device from their respective originally assigned groups and restore their position within their original groups. In some other embodiments, when the probability value is less than the predetermined threshold, the server may not update the group of the data record of the first advisor operating the first advisor computing device and the data record of the second advisor operating the second advisor computing device and restore their position within their original groups. The server may generate the final record of a restored placement of the data record of the first advisor and the data record of the second advisor in the groups and store the final record in the system database.

The server upon either authorizing the switching of the group of the data record of the first advisor operating the first advisor computing device and the data record of the second advisor operating the second advisor computing device, or restoring the position of the data record of the first advisor operating the first advisor computing device and the data record of the second advisor operating the second advisor computing device in their original groups may then move to a next iteration based on a programmatic iteration process of the selection of a new data record of a new advisor computing device of the plurality of advisor computing devices from one of the plurality of groups for the balanced distribution into the treatment group or the control group according to their Mahalanobis Distance. The server may continue the iteration process until all the data records of the advisors operating the advisor computing devices are uniformly distributed between the treatment group and the control group such that the covariates corresponding to the advisors within the treatment group and the control group are alike and balanced.

The server may generate and transmit a notification to one or more customer devices regarding an updated status of the advisors operating the advisor computing devices within the multiple groups, such as the treatment group and the control group. The notification may include a hyperlink, which may be displayed on an interactive graphical user interface of the customer devices. The hyperlink may be associated with the data record associated with each advisor operating the advisor computing device in each group. The data record associated with each advisor may include the information associated with a profile of a firm of the advisor, the asset information associated with the advisor, the risk data associated with each asset managed by the advisor, and the probability of redemption of the assets managed by the advisor. The server may then route each of the plurality of electronic requests to each of the plurality of customer devices based on a mapping of a first information contained in the data records of the advisors in each of the first group and the second group and a second information contained within the plurality of electronic requests.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc, laser disc, optical disc, digital versatile disc, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined here may be applied to other embodiments without departing from the spirit or scope of the subject matter. Thus, the present subject matter is not intended to be limited to the embodiments shown here but is to be accorded the widest scope consistent with the following claims and the principles and novel features disclosed here.

What is claimed is:

1. A server-implemented method for iteratively routing a plurality of electronic requests to a plurality of computing devices, each computing device represented by a data record, the server-implemented method comprising:
in response to receiving the plurality of electronic requests from a plurality of customer devices, selecting, by a server, a first data record representing a first computing device from a first group and a second data record representing a second computing device from a second group;
generating, by the server, a probability value based on a Mahalanobis Distance between a first value and a second value of each covariate of one or more covariates, the first value associated with a characteristic of a first user operating the first computing device and the second value associated with a same characteristic of a second user operating the second computing device, wherein the probability represents whether the one or more covariates have a balanced distribution between the first user and the second user;
upon the server determining that the probability value is greater than a predetermined threshold, authorizing, by the server, switching an association of the first data record to the second group instead of the first group and an association of the second data record to the first group instead of the second group;
upon the server determining that the probability value is less than the predetermined threshold, restoring, by the server, the first data record representing the first computing device and the second data record representing the second computing device in the first and second groups, respectively; and
routing, by the server, each of the plurality of electronic requests to the plurality of computing devices in each of the first group and the second group.

2. The server-implemented method according to claim 1, wherein the one or more covariates correspond to one or more control variables.

3. The server-implemented method according to claim 2, wherein at least one of the one or more control variables comprises a value of a redemption rate for a predefined period of time.

4. The server-implemented method according to claim 1, wherein one or more covariates are associated with a Standardized Euclidean distance.

5. The server-implemented method according to claim 1, wherein the first group corresponds to a treatment group.

6. The server-implemented method according to claim 1, wherein the second group corresponds to a control group.

7. A server-implemented method for iteratively routing a plurality of electronic requests to a plurality of computing devices, each computing device being associated with a geographic region and comprising a data record, the server-implemented method comprising:
in response to receiving the plurality of electronic requests from a plurality of customer devices, randomly selecting, by a server, the data record of a first computing device from at least one of a plurality of groups;
upon the server determining that the data record of the first computing device is selected from a first group:
randomly selecting, by the server, the data record of a second computing device associated with a same geographical region from a second group or a third group;
upon the server determining that the data record of the second computing device is not selected from the second group, transmitting, by the server, the data record of the second computing device into the first group and assign the data record of the first computing device as unselected; and
upon the server determining that the data record of the second computing device is selected from the second group, updating, by the server, the group associated with the data record of the first computing device from the first group to the second group and the group associated with the data record of the second computing device from the second group to the first group;
upon the server determining that the data record of the first computing device is not selected from the first group:
randomly selecting, by the server, the data record of the second computing device associated with the same geographical region from the first group or the third group;
upon the server determining that the data record of the second computing device is not selected from the first group, transmitting, by the server, the data record of the second computing device into the second group and mark the data record of the first computing device as unselected; and
upon the server determining that the data record of the second computing device is selected from the first group, updating, by the server, the group associated with the data record of the first computing device from the first group to the second group and the group associated with the data record of the second computing device from the second group to the first group;
calculating, by the server, a probability value for determining whether to update of the group associated with the data record of the first computing device from the first group to the second group and the group associated with the data record of the second computing device from the second group to the first group based on a Mahalanobis Distance between a first value and a second value of each covariate of one or more covariates, the first value associated with a characteristic of a first user operating the first computing device and the second value associated with a same characteristic of a second user operating the second computing device, wherein the probability represents whether the one or more covariates have a balanced distribution between the first user and the second user;
upon the server determining that the probability value is greater than a predetermined threshold:
authorizing, by the server, the update of the group associated with the data record of the first computing device from the first group to the second group and the group associated with the data record of the second computing device from the second group to the first group;

upon the server determining that the probability value is less than the predetermined threshold:
  restoring, by the server, the data record of the first computing device and the data record of the second computing device in their original groups; and
  routing, by the server, each of the plurality of electronic requests to each of the plurality of computing devices corresponding to information associated with user in each of the first group and the second group.

8. The server-implemented method according to claim 7, further comprising:
  storing, by the server, the data record associated with each of the plurality of computing devices in a non-transitory data storage device, wherein the data record of each of the plurality of computing devices comprises the one or more covariates.

9. The server-implemented method according to claim 8, further comprising:
  selecting, by the server, the data record of each of a subset of computing devices from the plurality of computing devices having highest value of predicted risks;
  randomly assigning, by the server, the data record of each of the subset of computing devices into the first group and the second group;
  iteratively selecting, by the server, the data record of each of remaining computing devices having subsequent highest value of predicted risks; and
  randomly assigning, by the server, the data record of each of the remaining computing devices into the first group and the second group.

10. The server-implemented method according to claim 9, further comprising:
  re-assigning, by the server, the data record of each of the plurality of computing devices into the first group and the second using the lowest Mahalanobis Distance between each covariate of the plurality of users operating the plurality of computing devices.

11. A system for iteratively routing a plurality of electronic requests to a plurality of computing devices, each computing device being associated with a geographic region and comprising a data record, the system comprising:
  a server comprising a processor and a memory, wherein with each iteration the server is configured to
    in response to receiving the plurality of electronic requests from a plurality of customer devices, randomly select the data record of a first computing device from at least one of a plurality of groups;
    upon the server determining that the data record of the first computing device is selected from a first group:
      randomly select the data record of a second computing device associated with a same geographical region from a second group or a third group;
      upon the server determining that the data record of the second computing device is not selected from the second group, transmit the data record of the second computing device into the first group and assign the data record of the first computing device as unselected; and
      upon the server determining that the data record of the second computing device is selected from the second group, update the group associated with the data record of the first computing device from the first group to the second group and the group associated with the data record of the second computing device from the second group to the first group;
    upon the server determining that the data record of the first computing device is not selected from the first group:
      randomly select the data record of the second computing device associated with the same geographical region from the first group or the third group;
      upon the server determining that the data record of the second computing device is not selected from the first group, transmit the data record of the second computing device into the second group and mark the data record of the first computing device as unselected; and
      upon the server determining that the data record of the second computing device is selected from the first group, update the group associated with the data record of the first computing device from the first group to the second group and the group associated with the data record of the second computing device from the second group to the first group;
    calculate a probability value of authorizing the update of the group associated with the data record of the first computing device from the first group to the second group and the data record associated with the second computing device from the second group to the first group based on a Mahalanobis Distance between a first value and a second value of each covariate of one or more covariates, the first value associated with characteristic of a first user operating the first computing device and the second value associated with a same characteristic of a second user operating the second computing device,
    wherein the probability represents whether the one or more covariates have a balanced distribution between the first user and the second user;
    upon the server determining that the probability value is greater than a predetermined threshold:
      authorize the update of the group associated with the data record of the first computing device from the first group to the second group and the group associated with the data record of the second computing device from the second group to the first group;
    upon the server determining that the probability value is less than the predetermined threshold:
      restore the data record of the first computing device and the data record of the second computing device in their original groups; and
      route each of the plurality of electronic requests to each of the plurality of computing devices corresponding to information associated with users in each of the first group and the second group.

12. The system according to claim 11, wherein with each iteration the server is further configured to:
  store the data record associated with each of the plurality of computing devices in a non-transitory data storage device, wherein the data record of each of the plurality of computing devices comprises the one or more covariates.

13. The system according to claim 12, wherein with each iteration the server is further configured to:
  select the data record of each of a subset of computing devices from the plurality of computing devices having highest value of predicted risks;
  randomly assign the data record of each of the subset of computing devices into the first group and the second group;

iteratively select the data record of each of remaining computing devices having subsequent highest value of predicted risks; and randomly assign the data record of each of the remaining computing devices into the first group and the second group.

14. The system according to claim 13, wherein the server is further configured to:

re-assign the data record of each of the plurality of computing devices into the first group and the second using the lowest Mahalanobis Distance between each covariate of the plurality of users operating the plurality of computing devices.

15. The system according to claim 11, wherein the one or more covariates are based on a Standardized Euclidean distance.

16. The system according to claim 11, wherein one or more covariates correspond to one or more control variables.

17. The system according to claim 16, wherein at least one of the one or more control variables comprises a value of a redemption rate for a predefined period of time.

18. The system according to claim 11, wherein the first group corresponds to a treatment group.

19. The system according to claim 11, wherein the second group corresponds to a control group.

20. The system according to claim 11, wherein the third group corresponds to an unselected group.

\* \* \* \* \*